US007710868B2

(12) United States Patent
Tsukizawa

(10) Patent No.: US 7,710,868 B2
(45) Date of Patent: May 4, 2010

(54) RECORDING MEDIA, INFORMATION PROCESSING APPARATUS, CONTROL METHOD AND PROGRAM

(75) Inventor: Kazuya Tsukizawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1183 days.

(21) Appl. No.: 11/098,880

(22) Filed: Apr. 5, 2005

(65) Prior Publication Data

US 2005/0254433 A1   Nov. 17, 2005

(30) Foreign Application Priority Data

May 11, 2004   (JP)   ............... 2004-141493

(51) Int. Cl.
*H04L 12/28* (2006.01)
*H04J 1/16* (2006.01)
*G08C 15/00* (2006.01)
*G06F 11/00* (2006.01)
*G01R 31/08* (2006.01)

(52) U.S. Cl. .................. 370/229; 370/241; 709/237; 713/320; 713/323

(58) Field of Classification Search ......... 370/229–241, 370/328–347, 466–749; 713/320–330; 709/235–239
See application file for complete search history.

(56) References Cited

U.S. PATENT DOCUMENTS

| 5,913,068 | A * | 6/1999 | Matoba ................ 713/322 |
| 7,100,063 | B2 * | 8/2006 | Sasagawa ............. 713/323 |
| 7,237,131 | B2 * | 6/2007 | Kwa et al. ............ 713/323 |
| 7,254,727 | B2 * | 8/2007 | Yoshiyama et al. ...... 713/320 |
| 7,325,151 | B2 * | 1/2008 | Maruichi et al. ....... 713/323 |
| 7,430,678 | B2 * | 9/2008 | Sasagawa ............. 713/323 |
| 2002/0196736 | A1 * | 12/2002 | Jin ................... 370/229 |
| 2005/0114721 | A1 * | 5/2005 | Azadet et al. ......... 713/320 |
| 2005/0197147 | A1 * | 9/2005 | Stephens et al. ....... 455/522 |
| 2006/0053316 | A1 * | 3/2006 | Yamazaki et al. ....... 713/300 |
| 2006/0059291 | A1 * | 3/2006 | Rosing ................ 710/305 |
| 2006/0095801 | A1 * | 5/2006 | Penning et al. ........ 713/320 |

FOREIGN PATENT DOCUMENTS

| JP | 2000-59429 | 2/2000 |
| JP | 2000-101580 | 4/2000 |
| JP | 2001-36600 | 2/2001 |
| JP | 2001036600 A * | 2/2001 |
| JP | 2001-211123 | 8/2001 |
| JP | 2002-117013 | 4/2002 |
| JP | 2004-118343 | 4/2004 |
| JP | 2004-128698 | 4/2004 |
| JP | 2004-534314 | 11/2004 |
| JP | 2005-260414 | 9/2005 |
| WO | WO03/001719 | 1/2003 |

* cited by examiner

*Primary Examiner*—Man Phan
(74) *Attorney, Agent, or Firm*—Jason O. Piché

(57) ABSTRACT

A method, program and an information processing apparatus to control a communication device having a plurality of communication modes which are different from each other in power consumption and communication rate, the program enabling the information processing apparatus to work as a communication throughput measuring section for measuring a communication throughput with which the communication device communicated in a predetermined reference period in the past, and a communication mode setting section for setting the communication mode of the communication device to a communication mode with lower power consumption and lower communication rate as compared with that of a communication mode set in a case where the communication throughput is higher, if the measured communication throughput is lower.

10 Claims, 4 Drawing Sheets

[Figure 2]
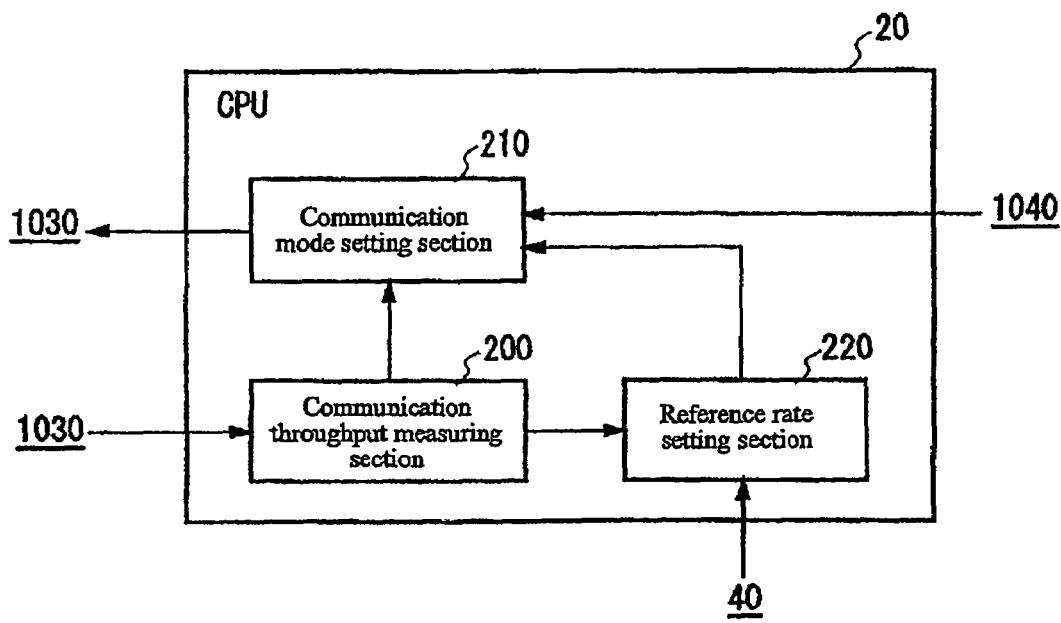
[Figure 3]
| Change from 10 Mbps to 100 Mbps | |
|---|---|
| Transmission side | 55% |
| Reception side | 50% |
| Change from 100 Mbps to 1 Gbps | |
|---|---|
| Transmission side | 60% |
| Reception side | 55% |

[Figure 4]
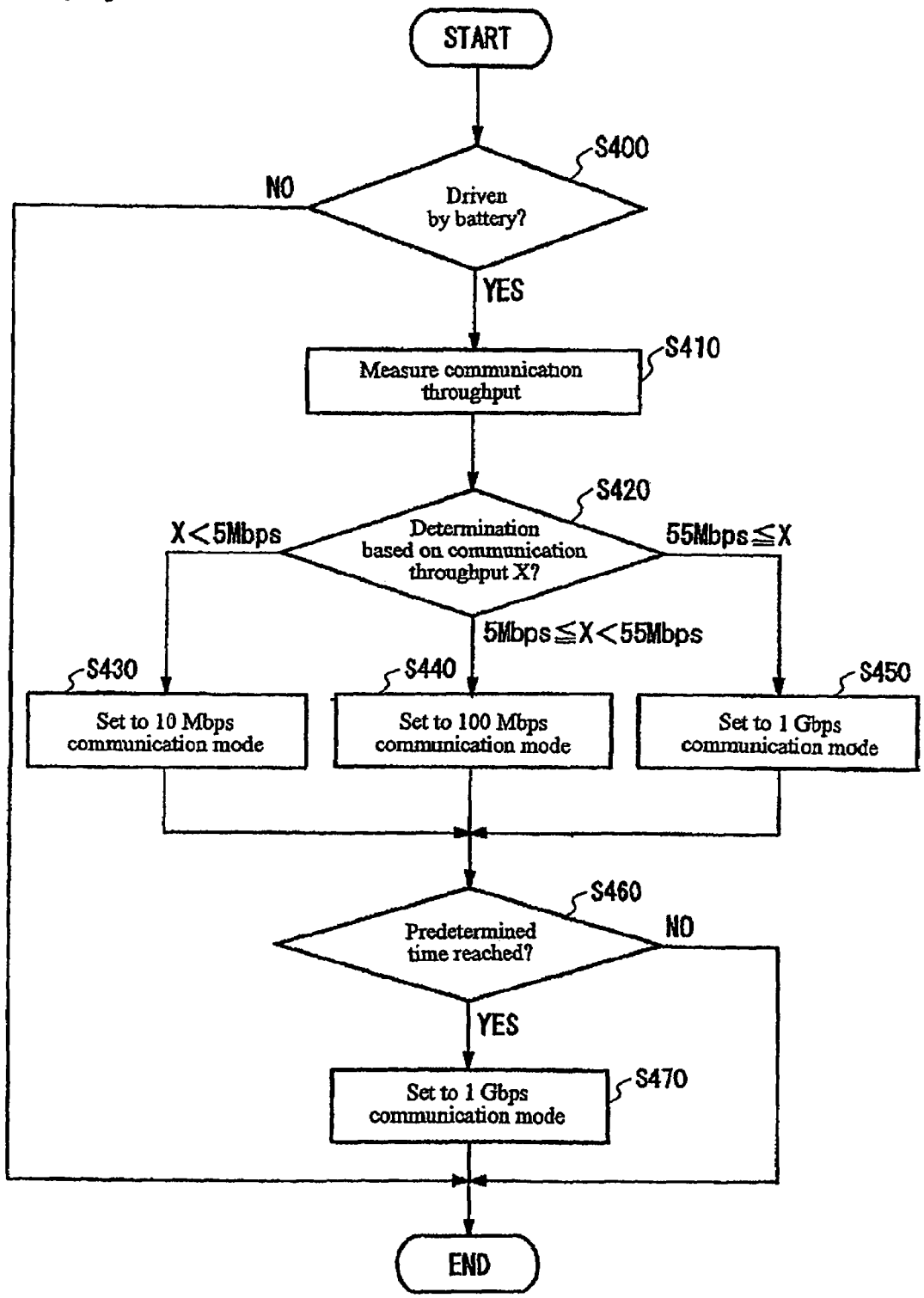

[Figure 5]
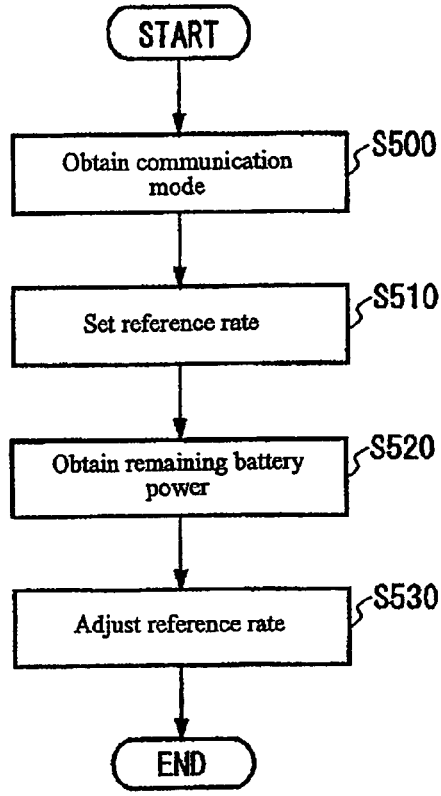
[Figure 6]
|  | Unconnected | 10 Mbps communication mode | 100 Mbps communication mode | 1 Gbps communication mode |
|---|---|---|---|---|
| Power consumption in communication device | 75 | 270 | 355 | 1.1W |

RECORDING MEDIA, INFORMATION PROCESSING APPARATUS, CONTROL METHOD AND PROGRAM

BACKGROUND OF THE INVENTION

The present invention relates to a recording media, an information processing apparatus, a control method and a program and, more particularly, to a recording media, an information processing apparatus, a control method and a program invented with the purpose of reducing power consumption.

With the development of networks in recent years, information processing apparatuses have come into use in connections to various networks. Devices constituting networks vary in performance depending on the networks. For example, recent network devices can perform communication at 1 Gbps at the maximum. On the other hand, network devices which can perform communication at 10 Mbps at the maximum are still being widely used. In conventional information processing apparatuses, therefore, an automatic negotiation function is used to set the maximum communication rate in each information processing apparatus at which communication can be performed between the information processing apparatus and a network device to which the information processing apparatus is connected. A technique of reducing the data transmission rate when there is no data to be transmitted is also being used (see patent document 1).

[Patent document 1] Published Unexamined Patent Application No. 2000-101580

In most cases, however, the information processing apparatus performs communication at a rate lower than the maximum communication rate in a set communication mode. Also, a communication device provided in the information processing apparatus consumes higher power in a communication mode of a higher maximum communication rate. In many cases, therefore, the information processing apparatus wastefully consumes power when set in a communication mode of an unnecessarily high communication rate. Further, in a communication mode of a high maximum communication rate, there is a possibility of the temperature of the body of the information processing device being excessively increased by heat produced by the communication device. In such a case, the information processing apparatus has the disadvantage of causing user discomfort for example.

Furthermore, according to the technique of the Patent Document 1, radio communication apparatus such as a mobile phone can control the data transmission rate for communicating with a basic station in accordance with the presence/absence of the data to be transmitted. For a versatile information processing apparatus such as a personal computer, however, since various application programs communicate at an arbitrary timing, it is difficult to calculate the amount of the data to be transmitted before the start of communication.

An object of the present invention is to provide a recording media, an information processing apparatus, a control method and a program capable of solving the above-described problems. This object can be attained by a combination of features described in the independent claims in the appended claims.

SUMMARY OF THE INVENTION

To achieve the above-described object, in a first form of the present invention, there are provided a program which enables an information processing apparatus to control a communication device having a plurality of communication modes which are different from each other in power consumption and communication rate, the program enabling the information processing apparatus to work as a communication throughput measuring section for measuring a communication throughput with which the communication device communicated in a predetermined reference period in the past, and a communication mode setting section for setting the communication mode of the communication device to a communication mode with lower power consumption and lower communication rate as compared with those of a communication mode set in a case where the communication throughput is higher, if the measured communication throughput is lower, a recording media on which the program is recorded, a control method for controlling the information processing apparatus by means of the program, and the information processing apparatus controlled by the control method.

In the summary of the present invention, not all the necessary features of the invention are listed. Subcombinations of the features can also constitute the present invention.

According to the present invention, it is possible to set the appropriate communication mode in accordance with the communication throughput.

BRIEF DESCRIPTION OF THE DRAWINGS

FIG. 2 is a functional block diagram of a CPU 20;

FIG. 3 shows an example of communication mode setting information 30;

FIG. 4 is a flowchart showing an example of processing when the information processing apparatus 10 sets a communication mode;

FIG. 5 is a flowchart showing an example of processing when the information processing apparatus 10 sets a reference rate; and FIG. 6 shows an example of different amounts of power consumption according to the communication mode.

PREFERRED EMBODIMENT OF THE PRESENT INVENTION

Figure 1:
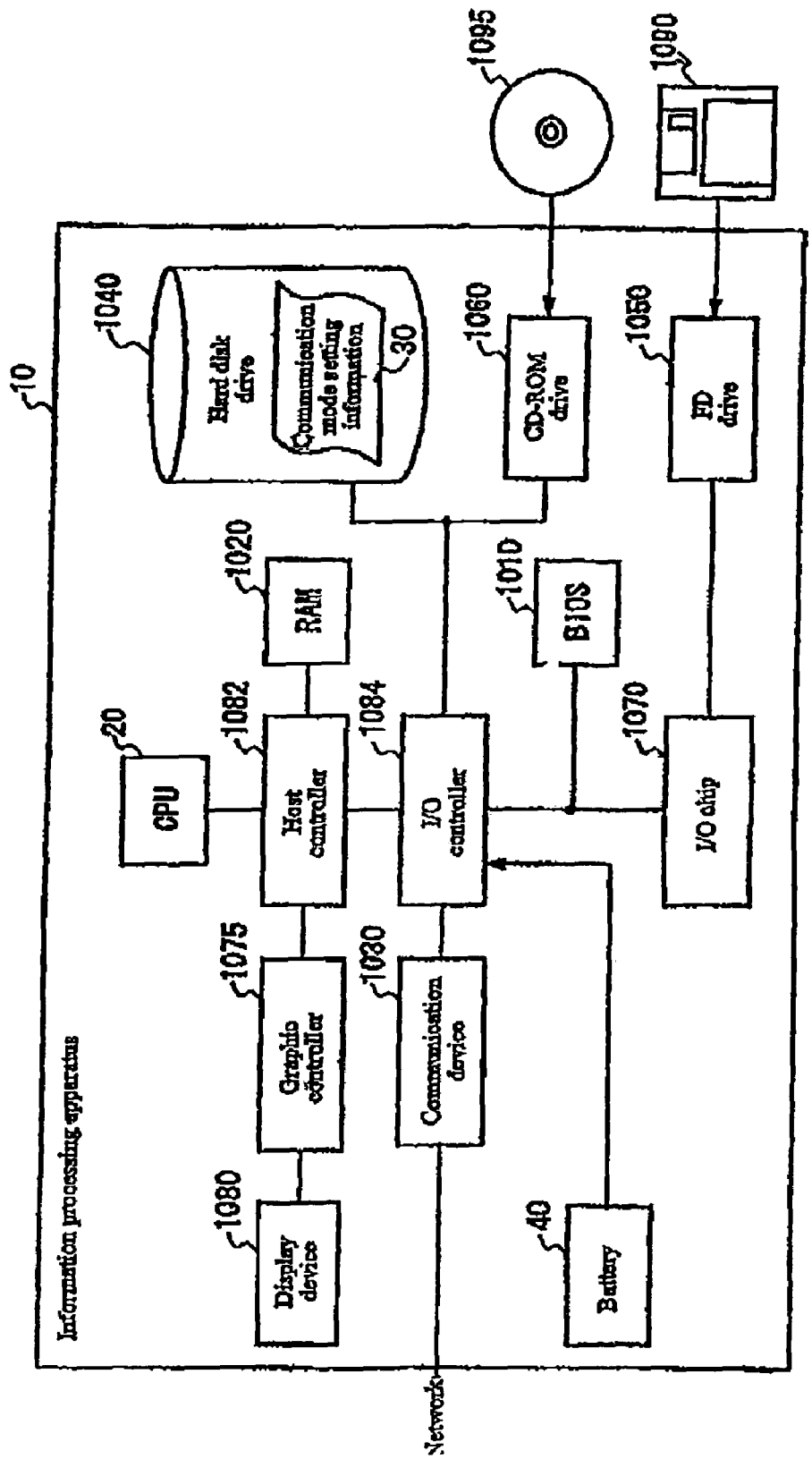
FIG. 1 is a block diagram of an information processing apparatus 10.

The present invention will be described with respect to an embodiment thereof. The embodiment described below, however, is not limiting of the invention set forth in the appended claims, and all combinations of features described in the description of the embodiment are not necessarily indispensable to the solution according to the present invention.

FIG. 1 is a block diagram of an information processing apparatus 10. The information processing apparatus 10 according to this embodiment set a suitable communication mode in a communication device on the basis of a measured communication throughput. This is intended to increase the communication rate when the communication throughput is large and to reduce power consumption when the communication throughput is small.

The information processing apparatus 10 has a CPU peripheral section having a CPU 20, a RAM 1020 and a graphic controller 1075 connected to each other by a host controller 1082. The information processing apparatus 10 also has an input/output section having a communication device 1030, a hard disk drive 1040 and a CD-ROM drive 1060 and connected to the host controller 1082 via an input/output controller 1084.

The information processing apparatus 1 also has a legacy input/output section having a BIOS 1010, a flexible disk drive 1050 and an input/output chip 1070 and connected to the input/output controller 1084. The host controller 1082 connects, to the RAM 1020, the CPU 20 and the graphic controller 1075, which access the RAM 1020 at a high transfer rate. The CPU 20 operates on the basis of programs stored in the BIOS 1010 and the RAM 1020, and controls each section.

The graphic controller 1075 obtains image data generated by the CPU 20 or some other device on a frame buffer provided in the RAM 1020, and displays the image data on a display device 1080. Alternatively, the graphic controller 1075 contains therein a frame buffer for storing image data generated by the CPU 20 or some other device. The input/output controller 1084 connects the host controller 1082, the communication device 1030, which is an input/output device of a comparatively high speed, the hard disk drive 1040 and the CD-ROM drive 1060.

The communication device 1030 performs communication with an external unit through a network. The communication device 1030 has a plurality of communication modes differing in power consumption and communication rate from each other. For example, the communication device 1030 has a 10 Mbps (bits per second) communication mode in which it can perform communication at 10 Mbps at the maximum, a 100 Mbps communication mode in which it can perform communication at 100 Mbps at the maximum, and a 1 Gbps communication mode in which it can perform communication at 1 Gbps at the maximum. The communication device 1030 stops communication during a switching period required for switching between the communication modes when switching between the communication modes is performed.

A battery 40 supplies power to each block of the information processing apparatus 10 when an AC power supply is not connected to the information processing apparatus 10. The battery 40 detects its drive condition and notifies a program which runs on the CPU 20 of the drive condition through the input/output controller 1084 or some other device. Connection lines through which the battery 40 supplies power to each component of the information processing apparatus 10 are not shown.

The hard disk drive 1040 stores programs and data used by the information processing apparatus 10. For example, the hard disk drive stores communication mode setting information 30 used by the CPU 20 to set the communication mode. The CD-ROM drive 1060 reads a program or data from a CD-ROM 1095 and provides the read program or data to the input/output chip 1070 via the RAM 1020.

To the input/output controller 1084 are also connected the BIOS 1010 and input/output devices of a comparatively low speed, i.e., the flexible disk drive 1050 and the input/output chip 1070 or the like.

The BIOS 1010 stores programs including a boot program executed by the CPU 20 at the time of startup of the information processing apparatus 10 and programs dependent on the hardware of the information processing apparatus 10.

The flexible disk drive 1050 reads a program or data from a flexible disk 1090 and provides the read program or data to the input/output chip 1070 via the RAM 1020. The input/output chip 1070 connects the flexible disk 1090 and various input/output devices, for example, through a parallel port, a serial port, a keyboard port, a mouse port, etc.

A program provided to the information processing apparatus 10 is provided by a user in a state of being stored on a recording medium, such as the flexible disk 1090, the CD-ROM 1095, or an IC card. The program is read out from the recording medium, installed in the information processing apparatus 10 via the input/output chip 1070 and/or the input/output controller 1084, and executed in the information processing apparatus 10. Operations which the information processing apparatus 10 is made by a program installed in and executed by the information processing apparatus 10 will be described below with reference to FIGS. 2 to 5.

The above-described programs may be stored on an external storage medium. As the recording medium, an optical recording medium such as a DVD or a PD, a magneto-optic recording medium such as an MD, a tape medium, a semiconductor memory such as an IC card, or the like can be used as well the flexible disk 1090 and the CD-ROM 1095. Also, a storage device such as a hard disk or a RAM provided in a server system connected to a special-purpose communication network or the Internet may be used as the recording medium to provide a program to the information processing apparatus 10 via the network.

FIG. 2 is a functional block diagram of the CPU 20. A program installed in the information processing apparatus 10 enables the CPU 20 to function as a communication throughput measuring section 200, a communication mode setting section 210 and a reference rate setting section 220. The communication throughput measuring section 200 measures the communication throughput with which the communication device 1030 communicated in a past predetermined period. The communication throughput measuring section 200 also obtains from the communication device 1030 the communication mode set in the communication device 1030.

If the measured communication throughput is lower, the communication mode setting section 210 sets the communication mode of the communication device 1030 to one of the communication modes with lower power consumption and lower communication rate as compared with those of a communication mode set in a case where the communication throughput is larger. For example, the communication mode setting section 210 first computes the use rate which is the ratio of the measured throughput to the maximum communication rate in the communication mode set in the communication device 1030.

The communication mode setting section 210 obtains from the hard disk drive 1040 communication mode setting information 30 indicating the value of a predetermined reference ratio used for setting of the communication throughput. The communication mode setting section 210 changes the communication mode of the communication device 1030 to another of the communication modes with a communication rate higher than that of the communication mode that has been set in the communication device 1030, if the computed use rate is equal to or higher than the predetermined reference ratio.

The reference rate setting section 220 obtains from the battery 40 information indicating whether or not the information processing apparatus 10 is being driven by the battery 40 and information indicating the remaining power of the battery 40. More specifically, the reference rate setting section 220 may obtain information or the like indicating whether or not the drive by the battery 40 is being performed from an embedded controller, which is not shown, or the like. The reference rate setting section 220 obtains from the communication throughput measuring section 200 the communication mode presently set in the communication device 1030. The reference rate setting section 220 adjusts, on the basis of these types of information obtained, the value of the reference rate to be referred to by the communication mode setting section 210.

FIG. 3 shows an example of communication mode setting information 30. The hard disk drive 1040 includes, as communication mode setting information 30, 10 Mbps communication mode setting information 32 and 100 Mbps communication mode setting information 34. The 10 Mbps communication mode setting information 32 indicates a reference rate to be referred to by the communication mode setting section 210 in the case of changing the communication mode of the communication device 1030 from the 10 Mbps communication mode to the 100 Mbps communication mode. The 100 Mbps communication mode setting information 34 indicates a reference rate to be referred to in the case of changing the communication mode of the communication device 1030 from the 100 Mbps communication mode to the 1 Gbps communication mode.

Also, the communication mode setting information 30 indicates reference rates respectively determined in correspondence with the transmission throughput, i.e., the communication throughput of transmission by the communication device 1030, and the reception throughput, i.e., the throughput of reception by the communication device 1030. An example of setting of the communication mode by the communication mode setting section 210 using the communication mode setting information 30 will now be described with reference to this figure.

Description will first be made of processing in the case of referring to 10 Mbps communication mode setting information 32. The communication mode setting section 210 first computes a transmission-side use rate which is the ratio of the transmission throughput with which the communication device 1030 transmitted to another apparatus to 10 Mbps, i.e., the maximum communication rate in the 10 Mbps communication mode. The communication mode setting section 210 then determines whether or not the transmission-side use rate is equal to or higher than the transmission-side reference rate (e.g., 55%) determined in correspondence with the transmission throughput. If the transmission-side use rate is equal to or higher than 55%, the communication mode setting section 210 changes the communication mode of the communication device 1030 from the 10 Mbps communication mode to the 100 Mbps communication mode.

The communication mode setting section 210 also computes a reception-side use rate which is the ratio of the reception throughput with which the communication device 1030 received from another apparatus to 10 Mbps, i.e., the maximum communication rate in the 10 Mbps communication mode. The communication mode setting section 210 then determines whether or not the reception-side use rate is equal to or higher than the reception-side reference rate (e.g., 50%) determined as a value lower than the transmission-side reference rate (55%). If the reception-side use rate is equal to or higher than 50%, the communication mode setting section 210 changes the communication mode of the communication device 1030 from the 10 Mbps communication mode to the 100 Mbps communication mode.

Thus, in a case where the transmission-side use rate in transmission by the communication device 1030 is equal to or higher than the transmission-side reference rate, or in a case where the reception-side use rate in reception by the communication device 1030 is equal to or higher than the reception-side reference rate, the communication mode setting section 210 can set the communication mode of the communication device 1030 to one of the communication modes with higher communication rate as compared with that of a communication mode set in a case where the transmission-side use rate is lower than the transmission-side reference rate and in a case where the reception-side use rate is lower than the reception-side reference rate.

Description will next be made of processing in the case of referring to 100 Mbps communication mode setting information 34. The communication mode setting section 210 computes a transmission-side use rate which is the ratio of the transmission throughput with which the communication device 1030 transmitted to another apparatus to 100 Mbps, i.e., the maximum communication rate in the 100 Mbps communication mode. The communication mode setting section 210 then determines whether or not the transmission-side use rate is equal to or higher than the transmission-side reference rate (e.g., 60%) determined in correspondence with the transmission throughput. If the transmission-side use rate is equal to or higher than 60%, the communication mode setting section 210 changes the communication mode of the communication device 1030 from the 100 Mbps communication mode to the 1 Gbps communication mode.

As is apparent from comparison between 10 Mbps communication mode setting information 32 and 100 Mbps communication mode setting information 34, the reference rate in the case of change from the 100 Mbps communication mode to the 1 Gbps communication mode is higher than the reference rate in the case of change from the 10 Mbps communication mode to the 100 Mbps communication mode. That is, the reference rate setting section 220 can set the reference rate in the case of communication in the 100 Mbps communication mode to a value higher than that in the case of communication in the 10 Mbps communication mode.

FIG. 4 is a flowchart showing an example of processing when the information processing apparatus 10 sets the communication mode. For example, the information processing apparatus 10 performs processing shown in the figure in a predetermined reference period. The reference rate setting section 220 first determines whether or not the information processing apparatus 10 is being driven by the battery 40 (S400). If the information processing apparatus 10 is not being driven by the battery 40 (S400: NO), the information processing apparatus 10 terminates processing.

If the information processing apparatus 10 is being driven by the battery 40 (S400: YES), the communication throughput measuring section 200 measures the communication throughput (S410). For example, the communication throughput measuring section 200 may compute the throughput by dividing the amount of data transmitted and received during the time period from the moment at which the preceding measurement is made to the present moment by this time period. Thus, the throughput measuring section 200 can measure the communication throughput in the predetermined period. Preferably, the reference period is longer than the switching period required for communication mode switching by the communication device 1030. That is, the communication throughput measuring section 200 measures the communication throughput communicated by the communication device 1030 during the past predetermined period longer than the switching period, thereby enabling the period during which communication can be performed to be increased relative to the period during which communication is stopped.

Let the value of the communication throughput measured by the communication throughput measuring section 200 be X. The communication mode setting section 210 determines whether or not the communication mode should be changed on the basis of the communication throughput in the immediately preceding reference period (S420). More specifically, the communication mode setting section 210 changes the communication mode on the basis of the communication mode setting information 30 shown in FIG. 3. For example, if X is lower than 5 Mbps, the communication mode setting section 210 sets the communication device 1030 in the 10 Mbps communication mode (S430). If X is equal to or higher than 5 Mbps and lower than 55 Mbps, the communication mode setting section 210 sets the communication device 1030 in the 100 Mbps communication mode (S440).

If X is equal to or higher than 55 Mbps, the communication mode setting section 210 sets the communication device 1030 in the 1 Gbps communication mode (S450). In the example shown in the figure, the reference rates for the 10 Mbps communication mode and the reference rates for the 100 Mbps communication mode are different from each other. The communication mode setting section 210 may alternatively use in the case of the 100 Mbps communication mode the same reference rates as those in the case of the 10 Mbps communication mode.

Subsequently, the communication mode setting section 210 determines whether or not a predetermined time earlier by the above-mentioned switching period than a time at which an increase in communication throughput is predicted is reached (S460). If the predetermined time is reached (S460: YES), the communication mode setting section 210 sets the communication mode of the communication device 1030 to another of the communication modes with a communication rate higher than that of the communication mode set in the communication device 1030, e.g., the 1 Gbps communication mode (S470).

For example, the communication mode setting section 210 may set the communication device 1030 in the 1 Gbps communication mode at a time earlier by the above-mentioned switching period than the time at which a piece of resident software periodically driven by a scheduler of an operating system is started. In this way, the communication rate can be increased in advance in preparation for an increase in communication throughput.

As shown in the figure, the communication mode setting section 210 can set a suitable one of the communication modes on the basis of conditions including the communication mode presently set as well as the past communication throughput. Further, if an increase in communication throughput is predicted, the communication rate can be increased in advance.

The communication mode setting section 210 periodically performs the above-described processing at intervals of a predetermined time period for example. Therefore, the communication mode is not changed during the passage of the predetermined time period after the communication mode setting section 210 has once changed the communication mode, thus preventing frequent stoppage of communication.

FIG. 5 is a flowchart showing an example of processing when the information processing apparatus 10 sets the reference rate. The reference rate setting section 220 obtains from the communication throughput measuring section 200 the communication mode presently set in the communication device 1030 (S500). The reference rate setting section 220 sets the reference rate in the case of communication in the 100 Mbps communication mode by the communication device 1030 to a value higher than that in the case of communication in the 10 Mbps communication mode (S510). More specifically, the reference rate setting section 220 may make the communication mode setting section 210 refer to 10 Mbps communication mode setting information 32 or 100 Mbps communication mode setting information 34.

The reference rate setting section 220 then obtains the remaining power of the battery 40 for driving the information processing apparatus 10 (S520). The reference rate setting section 220 sets the reference rate to a higher value as compared with that of the reference rate set in a case where the remaining amount of power is larger, if the remaining amount of power of the battery 40 for driving the information processing apparatus 10 is smaller (S530). More specifically, the reference rate setting section 220 may add a predetermined value to the values in the columns of 10 Mbps mode setting information 32 and 100 Mbps mode setting information 34 when the remaining power is equal to or lower than a reference level, thus limiting the reduction in battery power.

FIG. 6 shows an example of different amounts of power consumption according to the communication mode. The communication device 1030 has the 10 Mbps communication mode, the 100 Mbps communication mode and the 1 Gbps communication mode. When the communication device 1030 is set in the 1 Gbps communication mode, it consumes power of 1.1 W in a normal state in which it performs typical communication.

When the communication device 1030 is set in the 100 Mbps communication mode, it consumes power of 355 mW in the normal state in which it performs typical communication. When the communication device 1030 is set in the 10 Mbps communication mode, it consumes power of 270 mW in the normal state in which it performs typical communication.

The power consumption and transmission rate of the 10 Mbps communication mode, those of the 100 Mbps communication mode and those of the 1 Gbps communication mode are different from each other. In the information processing apparatus 10 in this embodiment, these communication modes are selectively used to increase the communication rate when the communication throughput is large and to reduce the power consumption when the communication throughput is small.

As described above, the reference rate setting section 220 sets the reference rate in the case of communication in the 100 Mbps communication mode to a value higher than that in the case of communication in the 10 Mbps communication mode. As is apparent from the figure, the difference between the power consumption in the 10 Mbps communication mode and the power consumption in the 100 Mbps communication mode is smaller than the difference between the power consumption in the 100 Mbps communication mode and the power consumption in the 1 Gbps communication mode. That is, the arrangement may be such that the communication mode can be changed easily if the increase in power consumption caused by changing the communication mode is smaller, and cannot be changed easily if the increase in power consumption caused by changing the communication mode is larger.

As described above with respect to an embodiment, the information processing apparatus 10 selectively uses a plurality of communication modes differing in power consumption and communication rate from each other to increase the communication rate when the communication throughput is large and to reduce the power consumption when the communication throughput is small, thereby limiting heat generation in the communication device.

While the present invention has been described with respect to an embodiment thereof, the technical scope of the present invention is not limited to the scope in the description of the embodiment. It is apparent to those skilled in the art that various changes and modifications can be made in the above-described embodiment. It is apparent from the description in the appended claims that forms obtained by making such changes or modifications are also included in the technical scope of the present invention.

What is claimed is:

1. A program on a computer-readable medium for executing instructions enabling an information processing apparatus to control a communication device having a plurality of communication modes which are different from each other in power consumption and communication rate, wherein the program allows the information processing apparatus to function as:
   a communication throughput measuring section for measuring a communication throughput with which the communication device communicated in a predetermined reference period of the past; and
   a communication mode setting section for setting a communication mode of the communication device to a communication mode with lower power consumption and lower communication rate as compared with those of a communication mode set in a case where the communication throughput is higher if the measured communication throughput is lower, but only on condition that the information processing apparatus is being driven exclusively by a battery, and for setting the communication mode of the communication device to a communication mode with higher communication rate as compared with that of a communication mode set in a case where the communication throughout is lower if a use rate, which is the ratio of the measured communication throughout to the maximum communication rate in the present communication mode set in the communication device, is equal to or higher than a predetermined reference rate.

2. The program according to claim 1, wherein the communication device has a 10 Mbps (megabits per second) communication mode in which it can perform communication at 10 Mbps at the maximum, a 100 Mbps communication mode in which it can perform communication at 100 Mbps at the maximum, and a 1 Gbps (gigabit per second) communication mode in which it can perform communication at 1 Gbps at the maximum; and the program enables the information processing apparatus to further function as a reference rate setting section for setting the reference rate in the case of communication in the 100 Mbps communication mode to a value higher than that in the case of communication in the 10 Mbps communication mode.

3. The program according to claim 1, wherein the communication mode setting section computes a transmission-side use rate, which is the use rate in transmission by the communication device, and a reception-side use rate, which is the user rate in reception by the communication device, and, in a case where the transmission-side use rate is equal to or higher than a predetermined transmission-side reference rate or in a case where the reception-side use rate is equal to or higher than a reception-side reference rate determined as a value lower than the transmission-side reference rate, sets the communication mode of the communication device to one of the communication modes with higher communication rate as compared with that of the communication mode set in a case where the transmission-side use rate is lower than the transmission-side reference rate and in a case where the reception-side use rate is lower than the reception-side reference rate.

4. The program according to claim 1, wherein the communication throughput measuring section measures the communication throughput for each reference time period; and the communication mode setting section determines whether or not the communication mode should be changed on the basis of the communication throughput in the immediately preceding reference period.

5. The program according to claim 1, wherein the communication mode setting section does not change the communication mode during passage of a predetermined time period after it has changed the communication mode.

6. The program according to claim 1, wherein, in response to change of the communication mode, the communication device stops communication during a switching period required for switching between the communication modes; and the communication throughput measuring section measures the communication throughput with which the communication device communicated during a past predetermined time period longer than the switching period.

7. The program according to claim 1, wherein, in response to change of the communication mode, the communication device stops communication during a switching period required for switching between the communication modes; and, at a time earlier by the switching period than a predetermined time at which an increase in communication throughput is predicted, the communication mode setting section changes the present communication mode set in the communication device to another of the communication modes with a communication rate higher than that of the present communication mode set in the communication device.

8. An information processing apparatus comprising:
   a communication device used to communicate with an outside apparatus and having a plurality of communication modes which are different from each other in power consumption and communication rate;
   a communication throughput measuring section for measuring a communication throughput with which the communication device communicated in a predetermined reference period of the past; and
   a communication mode setting section for setting a communication mode of the communication device to a communication mode with lower power consumption and lower communication rate as compared with those of a communication mode set in a case where the communication throughput is higher if the measured communication throughput is lower, but only on condition that the information processing apparatus is being driven exclusively by a battery, and for setting the communication mode of the communication device to a communication mode with higher communication rate as compared with that of a communication mode set in a case where the communication throughout is lower if a use rate, which is the ratio of the measured communication throughout to the maximum communication rate in the present communication mode set in the communication device, is equal to or higher than a predetermined reference rate.

9. A control method for enabling an information processing apparatus to control a communication device having a plurality of communication modes which are different from each other in power consumption and communication rate, the control method comprising:
   a communication throughput measuring step of measuring a communication throughput with which the communication device communicated in a predetermined reference period of the past; and
   communication mode setting steps of setting the communication mode of the communication device to a communication mode with lower power consumption and lower communication rate as compared with those of a communication mode set in a case where the communication throughput is higher if the communication throughput thus measured is lower, but only on condition that the information processing apparatus is being driven exclusively by a battery, and setting the communication mode of the communication device to a communication mode with higher communication rate as compared with that of a communication mode set in a case where the communication throughout is lower if a use rate, which is the ratio of the measured communication throughout to the maximum communication rate in the present communication mode set in the communication device, is equal to or higher than a predetermined reference rate.

10. The information processing apparatus according to claim 8, further comprising a reference rate setting section which, in a case where the remaining amount of power of a battery for driving the information processing apparatus is smaller, sets the reference rate to a value higher than that in a case where the remaining amount of power is larger.

* * * * *